(12) United States Patent
Kawabata et al.

(10) Patent No.: US 11,092,422 B2
(45) Date of Patent: Aug. 17, 2021

(54) MEASURING APPARATUS AND MEASURING METHOD

(71) Applicant: MITUTOYO CORPORATION, Kanagawa (JP)

(72) Inventors: Takeshi Kawabata, Kanagawa (JP); Kazuhiko Hidaka, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 230 days.

(21) Appl. No.: 16/437,765

(22) Filed: Jun. 11, 2019

(65) Prior Publication Data

US 2019/0390947 A1    Dec. 26, 2019

(30) Foreign Application Priority Data

Jun. 22, 2018    (JP) .............................. JP2018-119127

(51) Int. Cl.
*G01B 5/20*     (2006.01)
*G01B 5/012*    (2006.01)
*G01B 21/20*    (2006.01)

(52) U.S. Cl.
CPC .............. *G01B 5/20* (2013.01); *G01B 5/012* (2013.01); *G01B 21/20* (2013.01)

(58) Field of Classification Search
CPC .......... G01B 5/004; G01B 5/20; G01B 5/008; G01B 21/20
USPC ......... 33/503, 783, 549, 551, 552, 553, 554, 33/555
See application file for complete search history.

(56) References Cited

U.S. PATENT DOCUMENTS

| | | | | |
|---|---|---|---|---|
| 4,213,245 A * | 7/1980 | Armstrong | .............. | B21B 38/12 33/546 |
| 6,159,074 A * | 12/2000 | Kube | ........................ | B24B 5/00 33/549 |
| 6,513,253 B2 * | 2/2003 | Matsuda | ................... | G01B 3/30 33/502 |
| 6,758,085 B2 * | 7/2004 | Nagaike | ................. | G01B 3/008 33/503 |

(Continued)

FOREIGN PATENT DOCUMENTS

DE      102019004376 A1 *  12/2019  .......... G01B 21/042
EP      2 244 052 B1        10/2010

(Continued)

*Primary Examiner* — Christopher W Fulton
(74) *Attorney, Agent, or Firm* — Greenblum & Bernstein, P.L.C.

(57) ABSTRACT

A measuring apparatus and a measuring method capable of measuring a surface of an object includes a movable body having a mounting portion on which the object is mounted, and first and second surfaces not coplanar with each other, a first scale portion provided to press the first surface and to measure a first scale position along a first scale axis parallel to a normal direction of the first surface, a second scale portion provided to press the second surface and to measure a second scale position along a second scale axis parallel to a normal direction of the second surface, a first probe having a reference point of position measurement set on a probe axis parallel to the second direction and at an intersection of the first scale axis and the second scale axis, and a second probe measuring a position along the probe axis.

7 Claims, 7 Drawing Sheets

(56) References Cited

U.S. PATENT DOCUMENTS

| | | | |
|---|---|---|---|
| 7,395,607 B1* | 7/2008 | Broderick | B25J 7/00 |
| | | | 33/503 |
| 8,516,712 B2 | 8/2013 | Kumagai et al. | |
| 8,578,619 B2* | 11/2013 | Nakajima | G01M 11/025 |
| | | | 33/503 |
| 2001/0008994 A1* | 7/2001 | Omori | G01B 21/20 |
| | | | 702/95 |
| 2010/0058602 A1* | 3/2010 | McMurtry | G01B 5/008 |
| | | | 33/503 |
| 2010/0269362 A1* | 10/2010 | Bos | G01B 5/0002 |
| | | | 33/503 |
| 2012/0185210 A1* | 7/2012 | Takanashi | G01B 5/008 |
| | | | 702/168 |
| 2016/0265912 A1* | 9/2016 | Yasuno | G01B 3/30 |
| 2018/0372480 A1 | 12/2018 | Hidaka et al. | |
| 2019/0145753 A1* | 5/2019 | Omori | G01B 3/18 |
| | | | 33/813 |

FOREIGN PATENT DOCUMENTS

| | | | |
|---|---|---|---|
| JP | 3486546 B2 | | 10/2003 |
| JP | 2006052998 A | * | 2/2006 |
| JP | 3827493 B2 | | 7/2006 |
| JP | 4260180 B2 | | 2/2009 |
| JP | 4584029 B2 | | 9/2010 |
| JP | 4986530 B2 | | 5/2012 |

* cited by examiner

MEASURING APPARATUS AND MEASURING METHOD

CROSS-REFERENCE TO RELATED APPLICATION

This non-provisional application claims priority under 35 U.S.C. § 119(a) from Japanese Patent Application No. 2018-119127, filed on Jun. 22, 2018, the entire contents of which are incorporated herein by reference.

BACKGROUND

Technical Field

The present invention relates to a measuring apparatus and a measuring method, and more particularly to a measuring apparatus and a measuring method capable of measuring a position of a surface of an object with high accuracy and in a short time.

Background Art

A measuring apparatus for measuring a surface shape of an object, for example, obtains three-dimensional coordinates of a measurement point by contacting a stylus ball provided at a tip of a probe with the measurement point. For example, European Patent No. 2244052 discloses a measuring apparatus according to Abbe's principle. Abbe's principle means that the measured object and standard scales are aligned in the measurement direction. According to this principle, measurement accuracy can be enhanced.

Further, a measuring apparatus capable of performing measurement on each of an upper surface and a lower surface of an object is disclosed in Japanese Patent No. 4260180 and Japanese Patent No. 3486546. In this measuring apparatus, two measuring probes are arranged so as to face each other across the measuring object. With such a configuration, the upper and lower surfaces of the object can be measured in a short time without turning over the object.

Japanese Patent No. 382749, Japanese Patent No. 4584029, and Japanese Patent No. 4986530 disclose a measuring apparatus for performing high accuracy calibration by measuring three reference spheres.

SUMMARY OF THE INVENTION

Problems to be Solved by the Invention

When the shape (coordinates) of the surface of the object is acquired, a highly accurate measurement result can be obtained by measurement according to Abbe's principle. On the other hand, sufficient measurement time is required to perform highly accurate measurement on multiple points on the surface of the object. In the measuring apparatus, the measurement accuracy and the short measurement time are also important factors.

It is an object of the present invention to provide a measuring apparatus and a measuring method capable of measuring a surface of an object with high accuracy and in a short time.

Means for Solving the Problems

One aspect of the present invention is a measuring apparatus for measuring a position of a surface of an object in a first direction and a second direction orthogonal to the first direction. The measuring apparatus includes a movable body having a mounting portion on which an object is mounted, and first and second surfaces not coplanar with each other, a first scale portion provided to press the first surface and to measure a first scale position along a first scale axis parallel to a normal direction of the first surface, a second scale portion provided to press the second surface and to measure a second scale position along a second scale axis parallel to a normal direction of the second surface, a first probe having a reference point of position measurement set on a probe axis parallel to the second direction and at an intersection of the first scale axis and the second scale axis, and a second probe measuring a position along the probe axis.

In the measuring apparatus, the movable body is moved in the first direction and the second direction driven by the first scale portion and the second scale portion, the coordinate values in the first direction and the second direction of the first measurement, point are obtained based on the first scale position and the second scale position when the reference point is aligned with the first measurement point on the surface on one side of the object, and the position of the second measurement point on the surface on the other side of the object along the probe axis is measured by the second probe, and the coordinate values in the first direction and the second direction of the second measurement point are obtained based on the result of the measurement by the second probe.

According to such a configuration, the position of the surface on one side of the object can be measured by the first probe, and the position of the surface on the other side of the object can be measured by the second probe. At this time, since the reference point of the position measurement of the first probe is set at the intersection of the first scale axis and the second scale axis, it is possible to perform the position measurement with high accuracy by the reference point of the first probe according to Abbe's principle. In addition, since the position along the probe axis is measured by the second probe, it is possible to perform highly accurate position measurement with reference to the reference point of the first probe. That is, for high accuracy position measurement according to Abbe's principle, both the one side and the other side of the object can be measured in a short time by the first probe and the second probe.

In the measuring apparatus, a through hole may be provided in the mounting portion of the movable body, and the second probe may be provided to measure the position of the surface on the other side of the object through the through hole. Thus, the position of the surface on one side of the object can be measured by the first probe in a state where the object is mounted on the mounting portion, and the position of the surface on the other side of the object can be measured by the second probe through the through hole without replacing the object.

In addition, the movable body may further include a third surface non-parallel to the first surface and the second surface, and the measuring apparatus may include a third scale portion provided so as to press the third surface, and measuring a third scale position which is a position along a third scale axis parallel to the normal direction of the third surface, with the direction orthogonal to the first direction and the second direction as the third direction.

In this measuring apparatus, the reference point of the first probe is set at the intersection of the first scale axis, the second scale axis, and the third scale axis. Then, the movable body is moved in the first direction, the second direction, and the third direction driven by the first scale portion, the second scale portion, and the third scale portion, and the coordinate values in the first direction, the second direction, and the third direction of the first measurement point can be obtained based on the first scale position, the second scale position, and the third scale position when the reference point is aligned with the first measurement point, and the coordinate values in the first direction, the second direction, and the third direction of the second measurement point on the surface on the other side of the object can be obtained based on the result of the measurement by the second probe.

In the measuring apparatus, the second probe may be movably provided along the probe axis. With such a configuration, the coordinate value can be obtained by aligning the second probe with the measurement point of the object with the position of the first probe as a reference.

The measuring apparatus may further include a fixed frame for fixing the first probe, and a movable frame movably provided along the probe axis with respect to the fixed frame. In this measuring apparatus, the second probe is attached to the movable frame, and is provided so as to be movable on the probe axis together with the movable frame. With such a configuration, the movable frame is stably supported by the fixed frame to which the first probe is fixed, and the accuracy of position measurement by the second probe is improved.

Another aspect of the present invention is a measuring method for measuring a position of a surface of an object in a first direction and a second direction orthogonal to the first direction. the measuring method uses a measuring apparatus comprising: a movable body having a mounting portion for mounting the object on the movable body, and a first surface and a second surface which are not coplanar with each other; a first scale portion provided to press the first surface and to measure a first scale position along a first scale axis parallel to a normal direction of the first surface; a second scale portion provided to press the second surface and to measure a second scale position along a second scale axis parallel to a normal direction of the second surface; a first probe having a reference point of position measurement set on a probe axis parallel to the second direction and at an intersection of the first scale axis and the second scale axis; and a second probe measuring a position along the probe axis.

The measuring method comprises: a step of mounting an object on the mounting portion; a step of moving the movable body in the first direction and the second direction by driving the first scale portion and the second scale portion to align the reference point of the first probe with the first measurement point on the surface on one side of the object; and a step of obtaining coordinate values in the first direction and the second direction of the first measurement point on the basis of the first scale position and the second scale position when the reference point is aligned with the first measurement, point, and measuring the position of the second measurement point on the surface on the other side of the object along the probe axis with the second probe, and obtaining coordinate values in the first direction and the second direction of the second measurement point on the basis of the result of the measurement by the second probe.

According to such a configuration, it is possible to perform high accuracy position measurement according to Abbe's principle using the reference point of the first probe, and to measure the position in the second direction with respect to the reference point of the first probe with high accuracy using the second probe without replacing the object.

Another aspect of the present invention is a measuring method for measuring a position of a surface of an object in a first direction, a second direction orthogonal to the first direction, and a third direction orthogonal to the first direction and the second direction, wherein the measuring method uses a measuring apparatus comprising: a mounting portion for mounting the object; a movable body having a first surface, a second surface, and a third surface that are not coplanar with each other; a first scale portion provided to press the first surface and to measure a first scale position at a position along a first scale axis that is parallel to a normal direction of the first surface; a second scale portion provided to press the second surface and to measure a second scale position at a position along a second scale axis that is parallel to a normal direction of the second surface; a third scale portion provided to press the third surface and to measure a third scale position at a position along a third scale axis that is parallel to a normal direction of the third surface; and a first probe having a reference point of position measurement set on a probe axis parallel to the second direction and at an intersection of the first scale axis, the second scale axis and the third scale axis; and second probe measuring a position along the probe axis.

The measuring method comprises: a step of mounting the object on the mounting portion; a step of moving the movable body in the first direction, the second direction, and the third direction by driven by the first scale portion, the second scale portion, and the third scale portion to align the reference point with the first measurement point on the surface on one side of the object; and a step of obtaining the coordinate values in the first scale position, the second scale position, and the third scale position of the first measurement point when the reference point is aligned with the first measurement point, and measuring the position of the second measurement point on the surface on the other side of the object along the probe axis with the second probe, and obtaining the coordinate values in the first direction, the second direction, and the third direction of the second measurement point based on the result of the measurement by the second probe.

According to such a configuration, high accuracy three-dimensional position measurement according to Abbe's principle can be performed by the reference point of the first probe, and high accuracy three-dimensional position measurement using the reference point of the first probe as a reference point can be performed by the second probe without replacing the object.

DETAILED DESCRIPTION OF THE EMBODIMENTS

Figure 1:
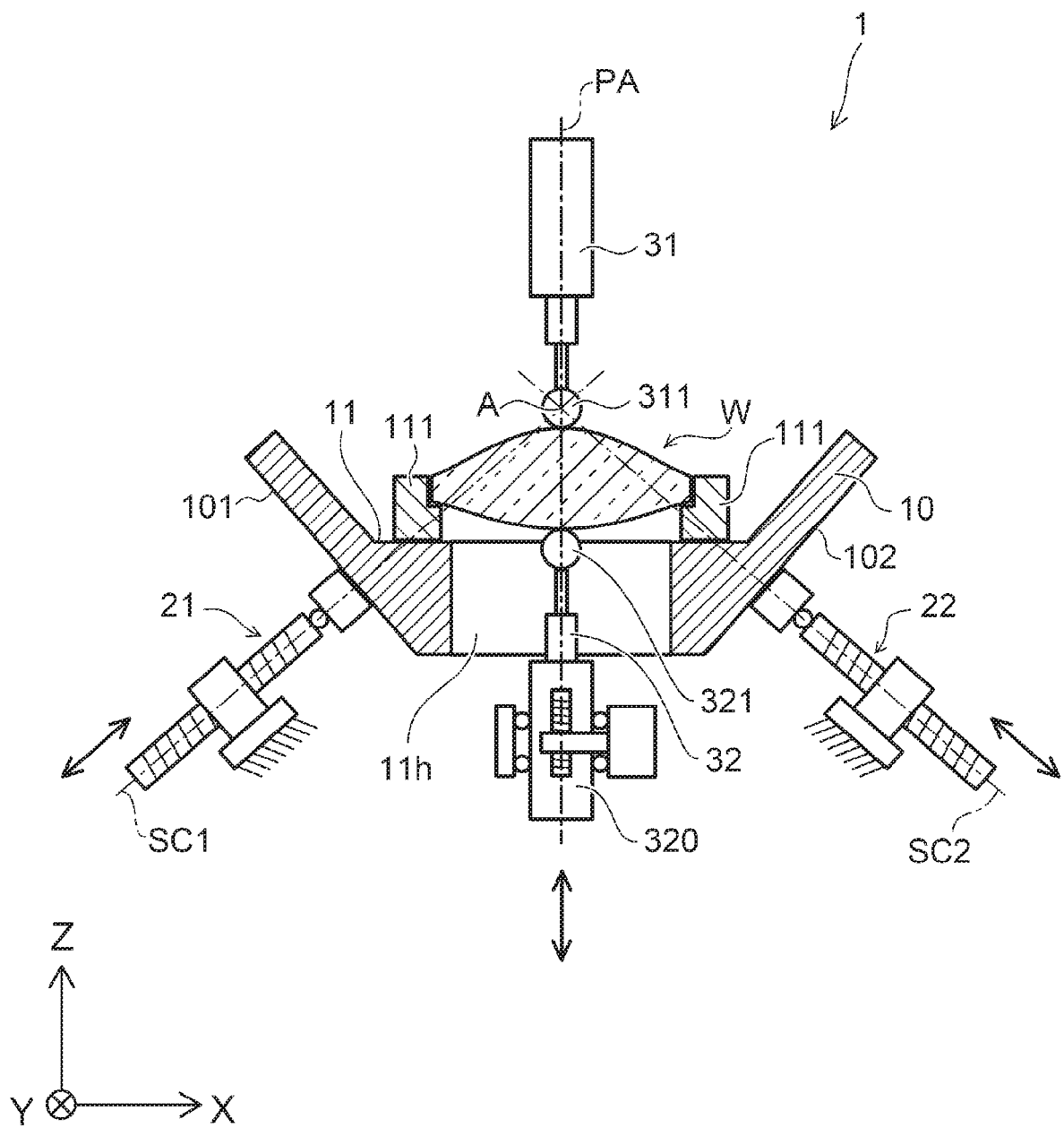
FIG. 1 is a schematic cross-sectional view illustrating a measuring apparatus according to the first embodiment.

Embodiments of the present invention will be described below with reference to the drawings. In the following description, the same members are denoted by the same reference numerals, and the description of the members once described is appropriately omitted.

First Embodiment

FIG. 1 is a schematic cross-sectional view illustrating a measuring apparatus according to the present embodiment.

Figure 2:
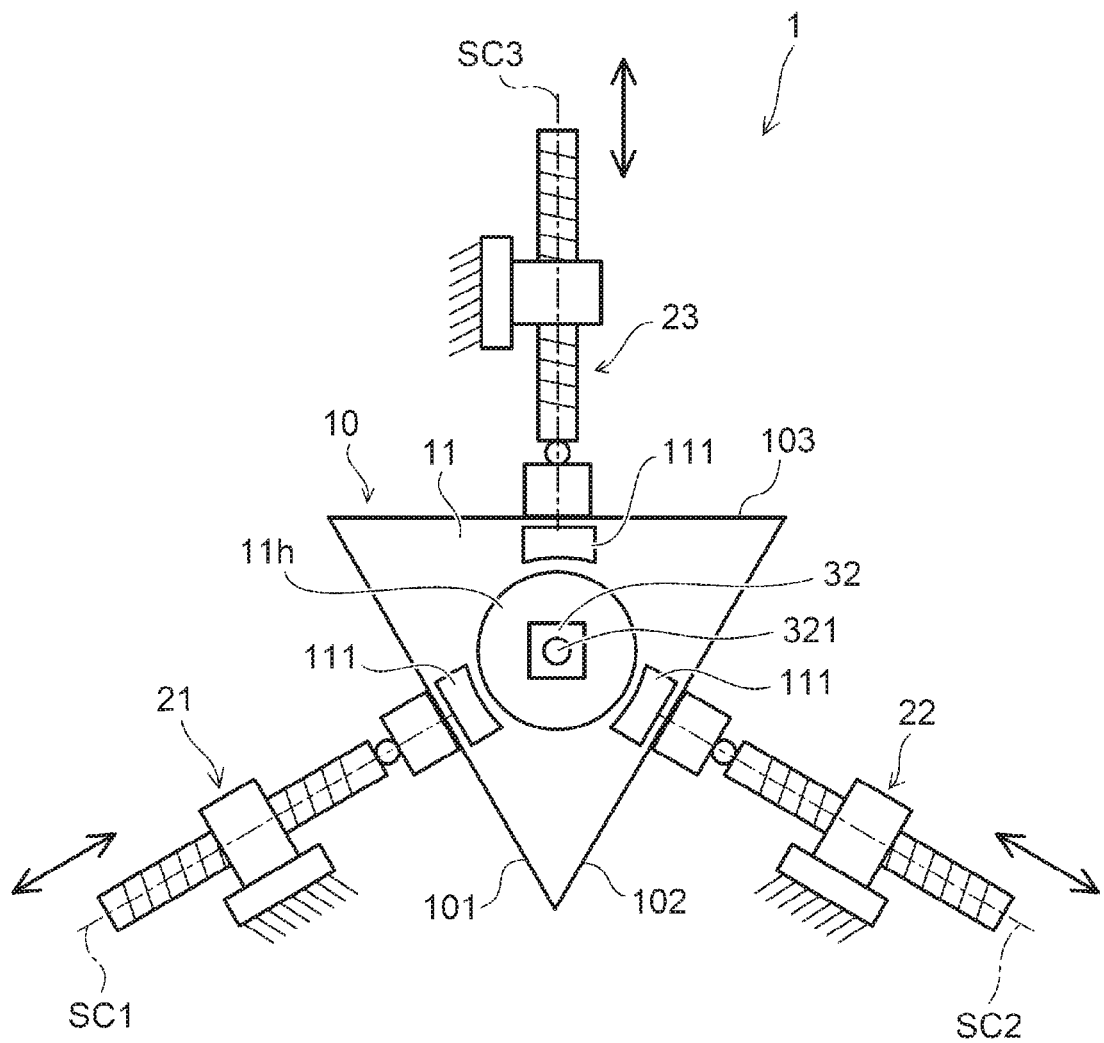
FIG. 2 is a schematic plan view illustrating the measuring apparatus according to the first embodiment.

FIG. 2 is a schematic plan view illustrating the measuring apparatus according to the present embodiment.

As shown in FIGS. 1 and 2, the measuring apparatus 1 according to the present embodiment is an apparatus for measuring the position (coordinates) of the surface of the object W. Here, in the present embodiment, the first direction is assumed to be the X direction, the second direction orthogonal to the first direction is assumed to be the Z direction, and the third direction orthogonal to the first direction and the second direction is assumed to be the Y direction. The Z direction is also referred to as a vertical direction and a thickness direction. The measuring apparatus 1 can measure the X, Y, Z coordinates of the surface of the object W with reference to a preset origin.

The measuring apparatus 1 includes a movable body 10 having a mounting portion 11 on which an object W is mounted, and a first surface 101, a second surface 102, and a third surface 103 which are not coplanar with each other. The mounting portion 11 is provided on the upper surface of the movable body 10. The mounting portion 11 is provided with a fixing piece 111 for fixing the object W. The first surface 101, the second surface 102, and the third surface 103, which are different from each other in the normal direction, are provided on the lower side of the movable body 10. The normal directions of the first surface 101, the second surface 102, and the third surface 103 do not need to be orthogonal to each other. Each of the first surface 101, the second surface 102, and the third surface 103 faces downward.

The movable body 10 is movable in the X, Y, and Z directions by the respective forward and backward movements of the first scale portion 21, the second scale portion 22, and the third scale portion 23. Each of the first scale portion 21, the second scale portion 22, and the third scale portion 23 includes a linear scale.

The first scale portion 21 is provided so as to press the first surface 101, and measures a first scale position which is a position along the first scale axis SC1 that is parallel to the normal direction of the first surface 101. That is, the linear scale in the first scale portion 21 is arranged along the first scale axis SC1. The pressing surface of the first scale portion 21 is not fixed to the first surface 101, but is provided so as to be slidable along the first surface 101.

The second scale portion 22 is provided so as to press the second surface 102, and measures a second scale position, which is a position along the second scale axis SC2 that is parallel to the normal direction of the second surface 102. That is, the linear scale in the second scale section 22 is arranged along the second scale axis SC2. The pressing surface of the second scale portion 22 is not fixed to the second surface 102, but is provided so as to be slidable along the second surface 102.

The third scale portion 23 is provided so as to press the third surface 103, and measures a third scale position, which is a position along the third scale axis SC3 that is parallel to the normal direction of the third surface 103. That is, the linear scale in the third scale section 23 arranged along the third scale axis SC3. The pressing surface of the third scale portion 23 is not fixed to the third surface 103, but is provided so as to be slidable along the third surface 103.

Here, the first scale axis SC1, the second scale axis SC2, and the third scale axis SC3 need not be parallel to the first direction (X direction), the second direction (Z direction), and the third direction (Y direction), respectively.

In the measuring apparatus 1 according to the present embodiment, the first scale axis SC1, the second scale axis SC2, and the third scale axis SC3 are provided so as to intersect at one point (intersection point A) above the movable body 10. A first probe 31 is provided above the object W, and a second probe 32 is provided below the object W.

A first stylus ball 311 is provided at the distal end of the first probe 31. The center of the first stylus ball 311 serves as a reference point for position measurement. The reference point is located on the probe axis PA parallel to the Z direction, and is located at the intersection point A of the first scale axis SC1, the second scale axis SC2, and the third scale axis SC3. In this manner, by setting the reference point of the position measurement of the first probe 31 to the intersection point A of the first scale axis SC1, the second scale axis SC2, and the third scale axis SC3, it is possible to perform highly accurate position measurement according to Abbe's principles by the reference point of the first probe 31.

The second probe 32 measures the position along the probe axis PA. A second stylus ball 321 is provided at the distal end of the second probe 32. The second probe 32 is provided so as to be movable back and forth along the probe axis PA. The probe position of the second stylus ball 321 in the second probe 32 along the probe axis PA is measured by the probe scale portion 320. The probe scale portion 320 includes a linear scale arranged along the probe axis PA. In the present embodiment, a through hole 11*h* is provided in the mounting portion 11 of the movable body 10, and the position of the surface of the object W can be measured by the second probe 32 through the through hole 11*h*.

In the measuring apparatus 1 having such a configuration, the movable body 10 is moved in each direction of X, Y, and Z driven by the first scale portion 21, the second scale portion 22, and the third scale portion 23, and the reference point of the first probe 31 is aligned with the first measurement point on the surface on one side of the object W. Then, coordinate values in the X, Y, and Z directions of the first measurement point are obtained based on the first scale position, the second scale position, and the third scale position at this time. Further, the coordinate values in the X, Y, and Z directions of the second measurement point on the surface on the other side of the object W are obtained based on the probe position of the second probe 32.

[Measuring Method]

First, the object W is placed on the mounting portion 11 of the movable body 10. The object W is fixed to the mounting portion 11 by the fixing piece 111. Next, the movable body 10 is appropriately moved in each of the K, Y, and Z directions driven by the first scale portion 21, the second scale portion 22, and the third scale portion 23. Here, the first scale portion 21 can move back and forth along the first scale axis SC1, the second scale portion 22 can move back and forth along the second scale axis SC2, and the third scale portion 23 can move back and forth along the third scale axis SC3. The movable body 10 can be moved in each of the X, Y, and Z directions by balancing the advancing and retracting of these scale portions.

For example, when all of the first scale portion 21, the second scale portion 22, and the third scale portion 23 are moved upward, the movable body 10 is raised in the Z direction. On the contrary, when all of the first scale portion 21, the second scale portion 22, and the third scale portion 23 are moved downward, the movable body 10 is lowered in the Z direction. Further, for example, when the first scale portion 21 is moved upward and the second scale portion 22 is moved downward, the movable body 10 is moved in the X direction. By controlling toe balance of advancing and retracting of these scale portions, the movable body 10 can be moved in the respective directions of X, Y, and Z by an arbitrary amount.

By moving the movable body 10 in this manner, the reference point of the first probe 31 is aligned with the first measurement point on the surface on one side of the object W. Here, matching the reference point of the first probe 31 to the first measurement point means adjusting the measurement posture using the reference point of the first probe 31 as a position reference. In the present embodiment, the first measurement point of the object hi is brought into contact with the first stylus ball 311 of the first probe 31 by moving the movable body 10.

When the first stylus ball 311 comes into contact with the surface of the object W, the can be detected by a detector such as a pressure-sensitive element (piezoelectric element). At the time of this detection, the position on the first scale axis SC1 (first scale position) is measured by the first scale section 21, the position on the second scale axis SC2 (second scale position) is measured by the second scale section 22, and the position on the third scale axis SC3 (third scale position) is measured by the third scale section 23. Based on these scale positions, the X, Y, and Z coordinates of the reference point can be obtained by calculation.

Next, in this state, the second probe 32 is raised in the Z direction, and the second stylus ball 321 is aligned with the second measurement point on the surface on the other side of the object W. Here, aligning the second stylus ball 321 to the second measurement point means adjusting the measurement posture with the center point of the second stylus ball 321 as a position reference. In the present embodiment, the second stylus ball 321 is brought into contact with the second measurement point on the surface on the other side of the object W.

When the second stylus ball 321 comes into contact with the surface of the object W, like the first stylus ball 311, the contact can be detected by a detector such as a pressure-sensitive element (piezoelectric element). At the timing of this detection, the probe position of the second probe 32 is measured by the probe scale section 320. The measurement position of the second probe 32 is obtained as the distance in the Z direction with reference to the reference point of the first probe 31, that is, the intersection point A based on the Abbe principle. Thereby, the coordinate values in the X, Y, and Z directions of the second measurement point on the surface on the other side of the object W can be obtained.

After the measurement at the first measurement point and the second measurement point is completed, the second probe 32 is once lowered, the movable body 10 is moved, and the measurement at the next measurement point is performed in the same manner.

Figure 3:
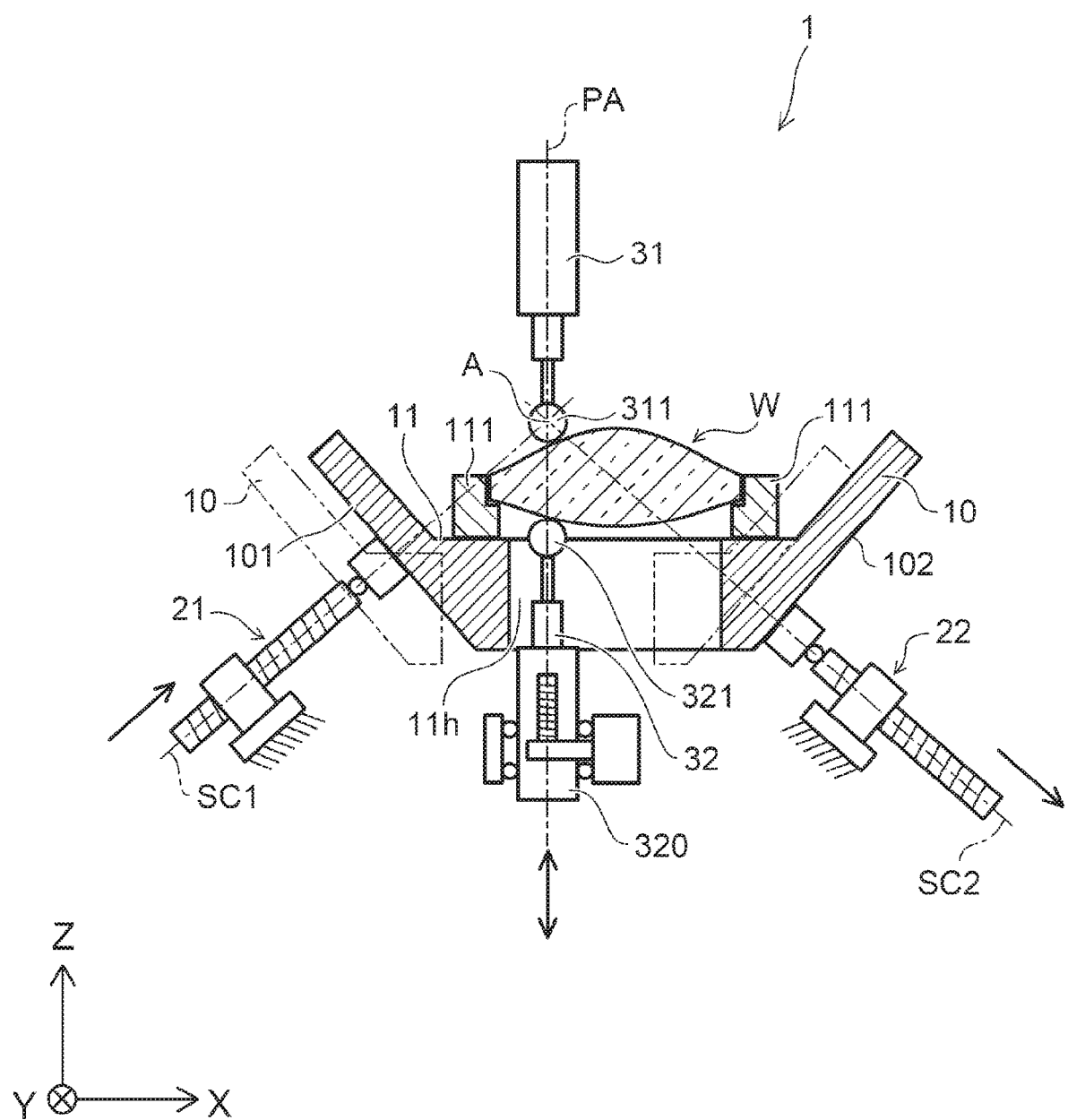
FIG. 3 is a schematic cross-sectional view showing an example of a state in which the movable body is moved.

FIG. 3 is a schematic cross-sectional view showing an example of a state in which the movable body is moved.

For example, the first scale portion 21 is moved upward, and the second scale portion 22 is moved downward. As a result, the movable body 10 moves in parallel in the X direction. Thereafter, the first scale portion 21, the second scale portion 22, and the third scale portion 23 are moved upward to move the movable body 10 in the Z direction. Then, the movement of the movable body 10 is stopped at a position where the surface on one side of the object W comes into contact with the first stylus ball 311. Then, the first scale position, the second scale position, and the third scale position at this time are measured, and the X, Y, and Z coordinates of the measurement point are calculated.

Thereafter, as before, the second probe 32 is raised in the Z direction, and the second stylus ball 321 is brought into contact with the surface on the other side of the object W. Then, by measuring the probe position of the second probe 32 at this time, coordinate values in the X, Y, and Z directions of the measurement point on the surface on the other side of the object W are obtained.

By repeating such a movement of the movable body 10 and the measurement operation by the first probe 31 and the second probe 32, the three-dimensional position (X, Y, Z coordinates) of both the surface on one side and the surface on the other side of the object W can be measured.

In the present embodiment, since the reference point of the position measurement of the first probe 31 is set to the intersection point A of the first scale axis SC1, the second scale axis SC2, and the third scale axis SC3, the high accuracy position measurement according to Abbe's principles can be performed by the reference point of the first probe 31. That is, when the measurement point is changed, the movable body 10 (the object W) moves, so that the reference point of the first probe 31 remains unchanged at the intersection point A of the scale axes. Therefore, the first scale position, the second scale position, and the third scale position can be measured at any measurement point according to Abbe's principle. This makes it possible to perform highly accurate position measurement.

In addition, in the present embodiment, it is possible to measure the position of the surface on the other side of the object W by the second probe 32 in a state where the position of the surface on the one side of the object W is measured by the first probe 31. Since the second probe 32 measures the probe position along the probe axis PA, it is possible to perform highly accurate position measurement with reference to the reference point of the first probe 31. In addition, since the position measurement can be performed by the second probe 32 through the through hole 11h, the position measurement can be performed on both of the surface on one side and the surface on the other side of the object W without replacing the object W.

Embodiment 2

Figure 4:
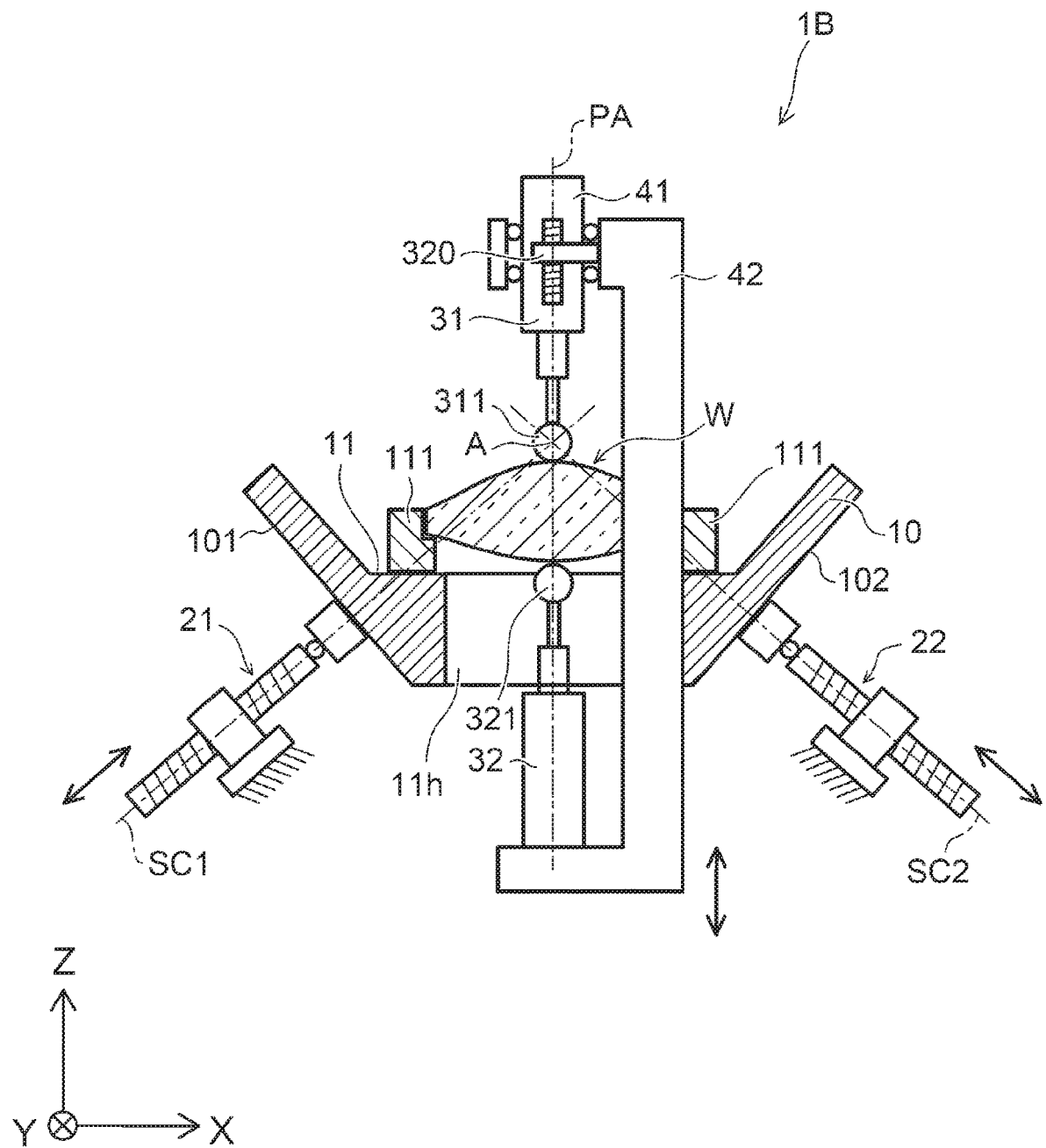
FIG. 4 is a schematic cross-sectional view illustrating the measuring apparatus according to the second embodiment.

FIG. 4 is a schematic cross-sectional view illustrating the measuring apparatus according to the second embodiment.

As shown in FIG. 4, the measuring apparatus 1B according to the present embodiment further includes a fixed frame 41 for fixing the first probe 31, and a movable frame 42 movably provided along the probe axis PA with reference to the fixed frame 41.

The fixed frame 41 is provided with a probe scale portion 320 along the probe axis PA so that the position of the movable frame 42 along the probe axis PA can be measured. The movable frame 42 is provided in a shape that does not interfere with the movement of the movable body 10, and extends to the lower side of the movable body 10. The movable frame 42 may be provided, for example, to extend over the movable body 10 through the through hole 11h. The second probe 32 is fixed to the lower end side of the movable frame 42. With such a configuration, the second probe 32 can be moved along the probe axis PA in accordance with the movement of the movable frame 42.

In such a measuring apparatus 1B, the movable frame 42 is stably supported by the fixed frame 41 to which the first probe 31 is fixed, and the second probe 32 can be stably moved along the probe axis PA together with the movable frame 42. As a result, the accuracy of the position measurement by the second probe 32 can be improved. In addition, since the probe scale portion 320 is also provided in the fixed frame 41 in which the first probe 31 is provided, it is possible to suppress the linear scale provided in the probe scale portion 320 from shifting from the probe axis PA.

Figure 5:
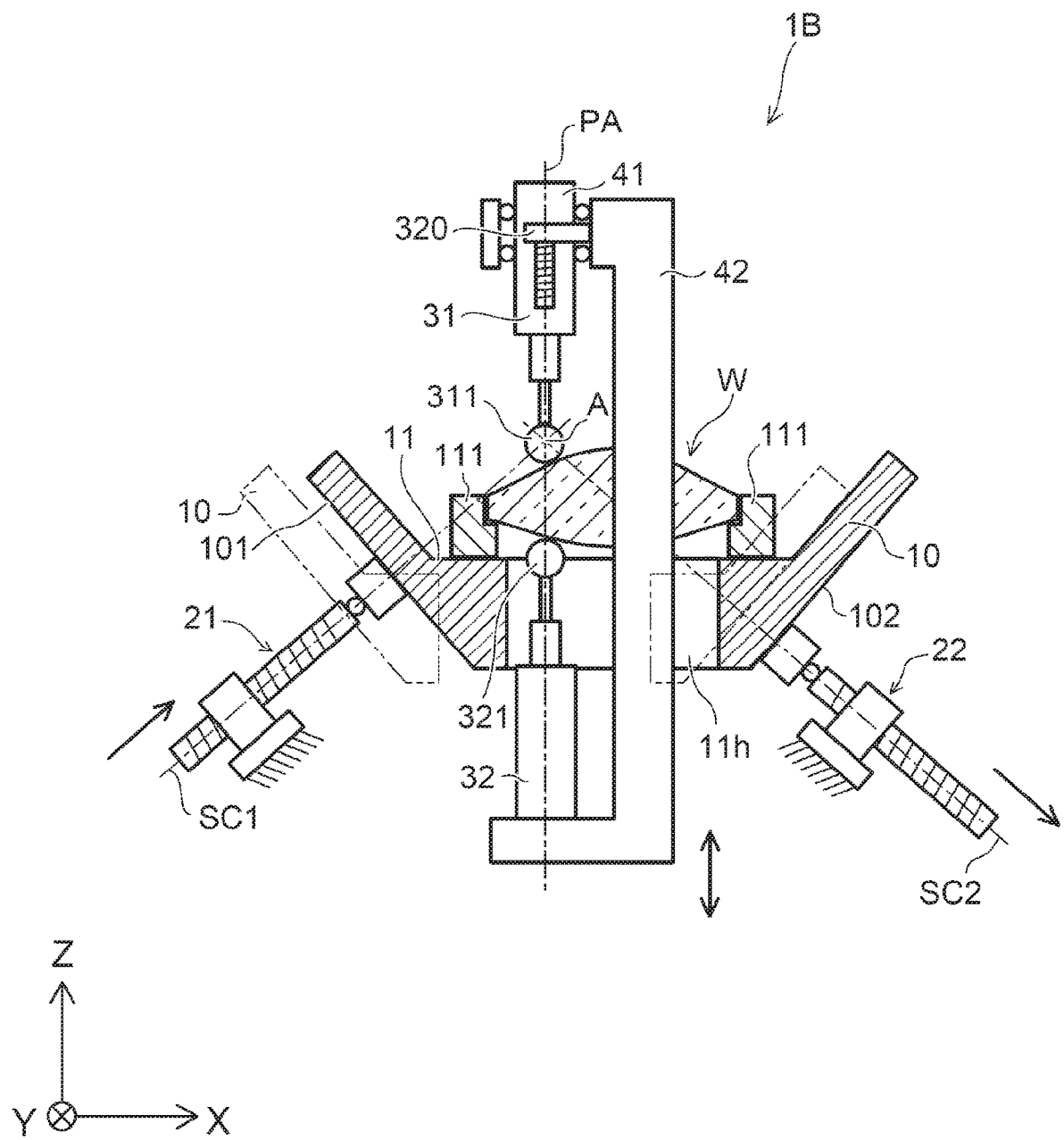
FIG. 5 is a schematic cross-sectional view showing an example of a state in which the movable body of the measuring apparatus according to the second embodiment is moved.

FIG. 5 is a schematic cross-sectional view showing an example of a state in which the movable body of the measuring apparatus according to the second embodiment is moved.

For example, the first scale portion 21 is moved upward, and the second scale portion 22 is moved downward. As a result, the movable body 10 moves in parallel in the X direction. Thereafter, the first scale portion 21, the second scale portion 22, and the third scale portion 23 are moved upward to move the movable body 10 in the Z direction. Then, the movement of the movable body 10 is stopped at a position where the surface on one side of the object W comes into contact with the first stylus ball 311. Then, the first scale position, the second scale position, and the third scale position at this time are measured, and the X, Y, and Z coordinates of the measurement point are calculated.

Thereafter, the second probe 32 is raised in the Z direction by moving the movable frame 42 along the probe axis PA, and the second stylus ball 321 is brought into contact with the surface on the other side of the object W. Then, by measuring the probe position of the second probe 32 at this time, coordinate values in the X, Y, and Z directions of the measurement point on the surface on the other side of the object W are obtained.

By repeating this operation, the three-dimensional position (X, Y, Z coordinates) of both the surface on one side and the surface on the other side of the object W can be measured.

In the measuring apparatus 1B according to the present embodiment, the fixed frame 41 and the movable frame 42 improve the accuracy of the movement of the second probe 32 along the probe axis PA, and the accuracy of the position measurement by the second probe 32 can be improved.

[Calibration Method]

Next, an example of a calibration method by the measuring apparatus 1 according to the present embodiment will be described.

Figure 6:
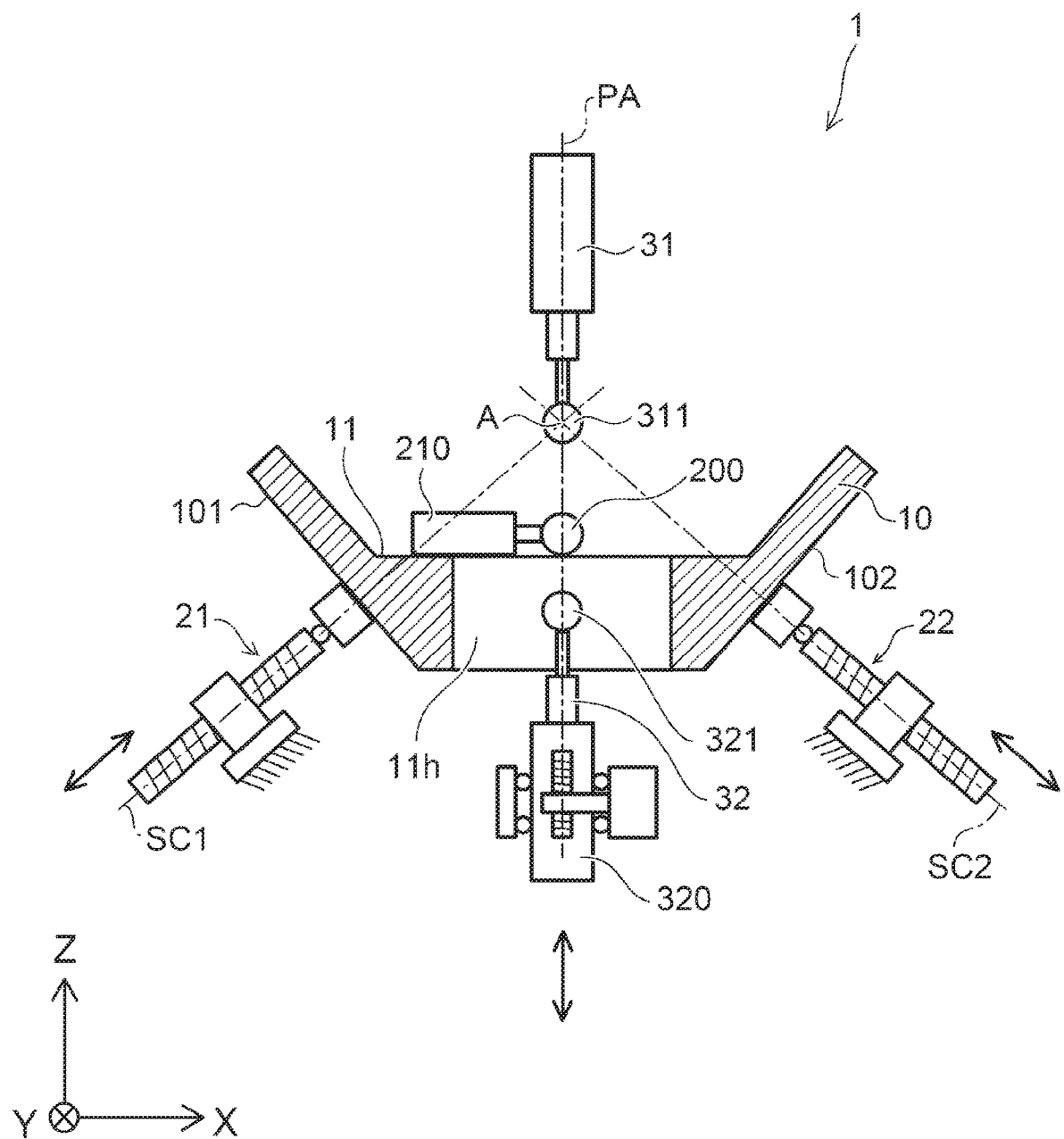
FIG. 6 is a schematic cross-sectional view illustrating the calibration method.

FIG. 6 is a schematic cross-sectional view illustrating the calibration method.

Figure 7:
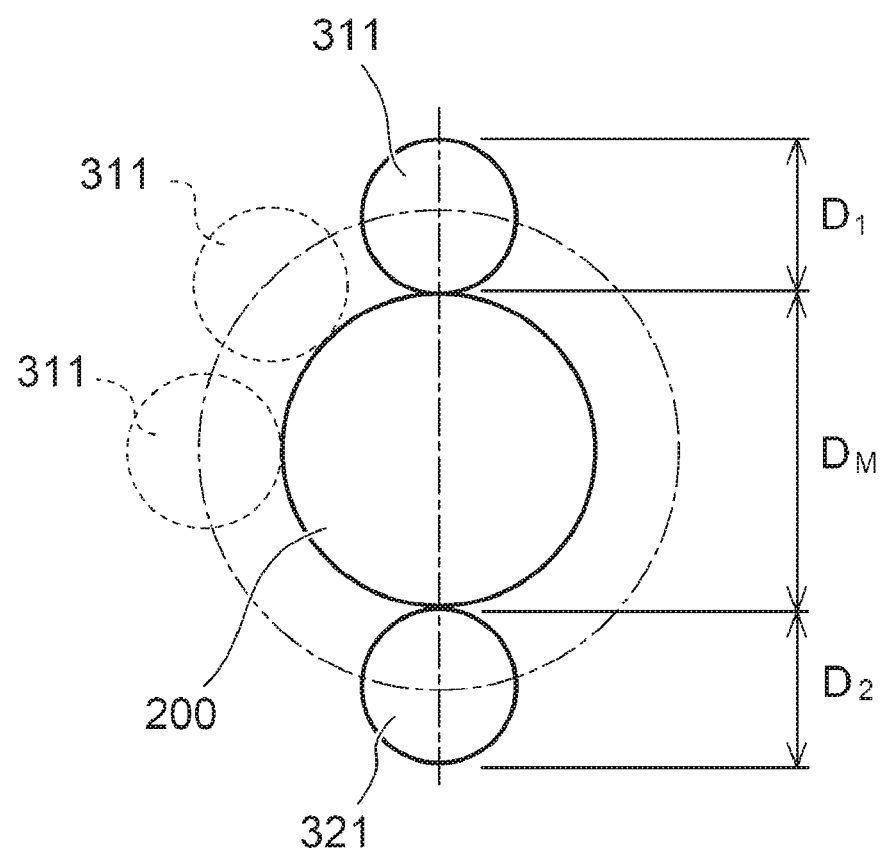
FIG. 7 is a schematic diagram illustrating the relationship between masters ball and a stylus ball in calibration.

FIG. 7 is a schematic diagram illustrating a relationship between a master ball and stylus balls in calibration.

As shown in FIG. 6, a master ball 200 is used to calibrate the measuring apparatus 1. The master ball 200 is a sphere for calibration having a known sphere diameter $D_M$. The master ball 200 is attached to the distal end of the holder 210.

In order to perform calibration of the measuring apparatus 1 according to the present embodiment, the holder 210 to which the master ball 200 is attached is mounted on the mounting portion 11 of the movable body 10. Next, the movable body 10 is moved to bring the first stylus ball 311 of the first probe 31 into contact with the master ball 200. The spherical diameter $D_1$ of the first stylus ball 311 is determined based on the measured values (coordinate values) of the first probes 31 measured at this time and the known spherical diameter $D_M$ of the master ball 200. The calibration by the first probe 31 is preferably performed at several points of the master ball 200.

Next, the second probe 32 is moved to bring the second stylus ball 321 of the second probe 32 into contact with the master ball 200. The spherical diameter $D_2$ of the second stylus ball 321 is determined on the basis of the measured values (coordinate values) of the second probes 32 and the known spherical diameter $D_M$ of the master ball 200. The calibration by the second probe 32 is preferably performed at several points of the master ball 200.

In the above description, the examples in which the spherical diameter $D_1$ of the first stylus ball 311 and the spherical diameter $D_2$ of the second stylus ball 321 are respectively determined by the master ball 200 have been described, but only the spherical diameter $D_1$ of the first stylus sphere 311 may be determined by the master ball 200. After the sphere diameter $D_1$ is determined, the first probe 31 may measure the second stylus ball 321 of the second probe 32 to determine the sphere diameter $D_2$.

In the determination of the center-to-center distances, since the ball diameter $D_1$ of the first stylus sphere 311 and the ball diameter $D_2$ of the second stylus sphere 321 have been determined by the master ball 200, the measured values when the thickness is zero can be grasped with high accuracy.

As described above, according to the embodiments, it is possible to perform high-accuracy position measurement according to the Abbe's principle by the first probe 31, and it is possible to measure both sides of the object W by the first probe 31 and the second probe 32, and it is possible to measure the entire surface of the object W with high accuracy and in a short time.

Modifications of the Embodiments

Although the embodiments have been described above, the present invention is not limited to these examples.

For example, in the embodiments described above, although the first probe 31 and the second probe 32 are described as contact type, at least one of them may be a non-contact type position measurement probe. As the non-contact type probe, it is preferable to use a probe provided with a sensor of a wavelength confocal system using axial chromatic aberration, in that measurement is possible even when the inclination of the surface of the object W is relatively large.

In the above embodiments, an example in which the three-dimensional position of X, Y, and Z is measured is shown, but it is also applicable to the case in which the two-dimensional position of X and Z is measured.

In addition, anything obtained by appropriately performing addition, removal or design alteration of a component with respect to the embodiments described above by a person skilled in the art or appropriate combination of the features of each embodiment is included in the range of the present invention as long as containing a gist of the present invention.

INDUSTRIAL APPLICABILITY

As described above, the present invention can be suitably applied to an apparatus for measuring the surface shape of the object W, such as a three-dimensional shape measuring apparatus.

What is claimed is:

1. A measuring apparatus for measuring a position of a surface of an object in a first direction and a second direction orthogonal to the first direction, the measuring apparatus comprising:
   a movable body having a mounting portion for mounting the object, a first surface, and a second surface which are not coplanar with each other;
   a first scale portion for measuring a first scale position, which is a position along a first scale axis parallel to a normal direction of the first surface and provided to press the first surface;
   a second scale portion for measuring a second scale position, which is a position along a second scale axis parallel to a normal direction of the second surface and provided to press the second surface;
   a first probe in which a reference point of position measurement is set, on a probe axis parallel to the second direction and at an intersection of the first scale axis and the second scale axis; and
   a second probe for measuring the position along the probe axis,
   wherein the movable body is moved in the first direction and the second direction driven by the first scale portion and the second scale portion, the coordinate values in the first direction and the second direction of a first measurement point are obtained based on the first scale position and the second scale position when the reference point is aligned with the first measurement point on the surface on one side of the object, and the position of a second measurement point on the surface on the other side of the object along the probe axis is measured by the second probe, and the coordinate values in the first direction and the second direction of the second measurement point are obtained based on the result of the measurement.

2. The measuring apparatus according to claim 1, wherein the mounting portion of the movable body is provided with a through hole, and
   wherein the second probe is provided to measure the position of the surface on the other side of the object through the through hole.

3. The measuring apparatus according to claim 1, wherein the direction orthogonal to the first direction and the second direction is defined to be a third direction,
   wherein the movable body has a third surface that is non-parallel to the first surface and the second surface,
   the measuring apparatus further comprises a third scale portion for measuring a third scale position, which is a position along a third scale axis parallel to a normal direction of the third surface and is provided to press the third surface,
   wherein the reference point of the first probe is set to the intersection of the first scale axis, the second scale axis, and the third scale axis,
   wherein the movable body is moved in the first direction, the second direction, and the third direction driven by the first scale portion, the second scale portion, and the third scale portion, and the coordinate values in the first direction, the second direction, and the third direction of the first measurement point are obtained based on the first scale position, the second scale position, and the third scale position when the reference point is aligned with the first measurement point, and the coordinate values in the first direction, the second direction, and the third direction of the second measurement point are obtained based on the result of measurement by the second probe.

4. The measuring apparatus according to claim 1, wherein the second probe is movably provided along the probe axis.

5. The measuring apparatus according to claim 1, further comprises:
   a fixing frame for fixing the first probe; and
   a movable frame movably provided along the probe axis with respect to the fixed frame,
   wherein the second probe is mounted on the movable frame and is movably provided on the probe axis together with the movable frame.

6. A measuring method for measuring a position of a surface of an object in a first direction and a second direction orthogonal to the first direction,
   the measuring method uses measuring apparatus comprising:
   a movable body having a mounting portion for mounting the object, a first surface, and a second surface which are not coplanar with each other;
   a first scale portion for measuring a first scale position, which is a position along a first scale axis parallel to a normal direction of the first surface and provided to press the first surface;
   a second scale portion for measuring a second scale position, which is a position along a second scale axis parallel to a normal direction of the second surface and provided to press the second surface;
   a first probe in which a reference point of position measurement is set on a probe axis parallel to the second direction and at an intersection of the first scale axis and the second scale axis; and
   a second probe for measuring the position along the probe axis,
   wherein the measuring method comprising:
   a step of mounting the object on the mounting portion,
   a step of moving the movable body in the first direction and the second direction driven by the first scale portion and the second scale portion, and aligning the reference point with a first measurement point on a surface on one side of the object; and
   a step of obtaining the coordinate values in the first direction and the second direction of the first measurement point based on the first scale position and the second scale position when the reference point is aligned with the first measurement point, measuring the position of a second measurement point on the surface on the other side of the object along the probe axis with the second probe, and obtaining the coordinate values in the first direction and the second direction of the second measurement point based on the result of the measurement by the second probe.

7. A measuring method for measuring a position of a surface of an object in a first direction, a second direction orthogonal to the first direction, and a third direction orthogonal to the first direction and the second direction,
   the measuring method uses measuring apparatus comprising:
   a movable body having a mounting portion for mounting the object, and a first surface, a second surface, and a third surface that are not coplanar with each other;
   a first scale portion for measuring a first scale position, which is a position along a first scale axis parallel to a normal direction of the first surface and provided to press the first surface;

a second scale portion for measuring a second scale position, which is a position along a second scale axis parallel to a normal direction of the second surface and provided to press the second surface;

a third scale portion for measuring a third scale position, which is a position along a third scale axis parallel to a normal direction of the third surface and provided to press the third surface;

a first probe in which a reference point of position measurement is set on a probe axis parallel to the second direction and at an intersection of the first scale axis, the second scale axis, and the third scale axis; and a second probe for measuring the position along the probe axis, wherein the measuring method comprising:

a step of mounting the object on the mounting portion;

a step of moving the movable body in the first direction, the second direction, and the third direction driven by the first scale portion, the second scale portion, and the third scale portion, and aligning the reference point with a first measurement point on a surface on one side of the object;

a step of obtaining coordinate values in the first direction, the second direction, and the third direction of the first measurement point based on the first scale position, the second scale position, and the third scale position when the reference point is aligned with the first measurement point, measuring a position along the probe axis of a second measurement point on the surface on the other side of the object with the second probe, and obtaining coordinate values in the first direction, the second direction, and the third direction of the second measurement point based on a result of the measurement by the second probe.

* * * * *